United States Patent [19]

Ho

[11] 4,158,310
[45] Jun. 19, 1979

[54] OPTICAL PRESSURE TRANSDUCER OF RANDOMLY DISTRIBUTED FIBER OPTICS

[75] Inventor: Chih-Ming Ho, Torrance, Calif.

[73] Assignee: University of Southern California, Los Angeles, Calif.

[21] Appl. No.: 873,757

[22] Filed: Jan. 30, 1978

[51] Int. Cl.² ............................................. G01L 9/00
[52] U.S. Cl. ........................................ 73/705; 73/717; 250/231 P
[58] Field of Search ................. 73/705, 715, 716, 717, 73/723; 250/231 P

[56] References Cited

U.S. PATENT DOCUMENTS 3,842,353  10/1974  Stewart ............................ 250/231 P

FOREIGN PATENT DOCUMENTS 578172  10/1975  Switzerland ............................ 73/705

Primary Examiner—Donald O. Woodiel
Attorney, Agent, or Firm—Nilsson, Robbins, Dalgarn, Berliner, Carson & Wurst

[57] ABSTRACT

An optical pressure transducer utilizing a deformable diaphragm having a reflective surface in which a fiber optic bundle having at least 100 optical fibers is randomly divided at one end into two bundles consisting of a light source bundle, the end of which is irradiated by a light source, and a reflected light bundle, the end of which conveys light reflected from a pressure-sensitive diaphragm to a light detection means.

4 Claims, 4 Drawing Figures

OPTICAL PRESSURE TRANSDUCER OF RANDOMLY DISTRIBUTED FIBER OPTICS

FIELD OF THE INVENTION

This invention relates to pressure measurement devices and more particularly to fiber optic pressure transducers.

BACKGROUND AND SUMMARY OF THE INVENTION

Fiber optic bundles having randomly distributed light source fibers and reflected light fibers have been utilized for angular displacement measurements by irradiating a moveable, non-deformable surface with light radiated from the ends of the light source fibers and measuring light reflected from the surface that irradiates the ends of the reflected light fibers. Such devices have been used for angular measurements of rotating surfaces having fixed reflective and non-reflective portions. As the non-reflective portion of the surface covers a larger part of the angle subtended by the fiber optic bundle end, the intensity of the reflected light decreases in proportion to the displacement of the surface with respect to the fiber optic bundle end. However, use of this type of fiber optic bundle has been limited to displacement measurements of solid surfaces having variable reflective characteristics. Accurate and repeatable calibration of surface displacement as a function of reflected light intensity has required reflecting surface to be non-deformable.

In contast to fiber optic-angular displacement transducers described above, conventional fiber optic pressure transducers have been constructed from a plurality of discrete optical fiber bundles have a predetermined geometrical orientation with respect to each other. Various geometrical orientations have been proposed in order to obtain maximum transducer response. In one configuration, a central fiber bundle is surrounded by six additional fiber bundles. The central bundle transmits light from a light source to a pressure-sensitive diaphragm having a reflective surface. The six bundles surrounding the central bundle transmit light reflected from the diaphragm to an intensity measurement device such as a photocell. The amount of reflected light depends on the distortion of the diaphragm due to a pressure differential across the diaphragm surfaces. There are three disadvantages to a conventional system utilizing well organized, discrete fiber optic bundles. These are (1) fabrication requires careful assembly with attendant high cost, (2) calibration is very sensitive to the relative position of the fiber bundles with respect to the reflecting diaphragm and the orientation of the light source with respect to the central bundle; and (3) a well organized array of discrete fiber optic bundles carries the characteristics of the light source for a significant distance. It has been found that 90 centimeters of fiber are required to average out the effects caused by an incandescent light bulb filament, resulting in a bulky transducer and high cost.

The optical pressure transducer of the present invention eliminates the above described problems by utilizing, in conjunction with a deformable diaphragm having a reflective surface, an optical fiber bundle having randomly distributed light source fibers and reflected light fibers. A large number of optical fibers randomly distributed are utilized to define light source and refleted light fibers combined into a single fiber optics bundle at one end and branched into two bundles at the opposite end. The single bundle end is positioned respective a pressure-sensitive, light-reflecting diaphragm. The branched end of the combined bundle defines a light source bundle and a reflected light bundle. The end of the light source bundle is irradiated by a light source and conducts light to the diaphragm. The reflected light bundle conducts light reflected by the diaphragm. A photocell or the like measures light radiated from the reflected light bundle end. By randomly selecting the light source bundle optical fibers and the reflected light bundle optical fibers from the combined bundle, there is obtained a random distribution of optical fiber types in an end cross section of the combined bundle. It is preferred to use very thin optical fibers, on the order of 0.001 inch in diameter so that the combined bundle will have at least 100 optical fibers and in many cases 500 or more.

There are many advantages of an optical pressure transducer constructed according to the present invention. A lower manufacturing cost is possible because the light source optical fibers and reflected light optical fibers are selected randomly from the combined bundle of optical fibers, thereby eliminating the need to position them according to a predetermined configuration. A further result of random selection is that calibration of the reflected light intensity as a function of diaphragm deformation is not sensitive to the relative locations of individual fibers within the combined bundle. Accordingly, one calibration curve can be used for different transducers of the same type while still maintaining a high degree of accuracy. An additional advantage is that, within practical bounds, there is virtually no limitation on the shortness of the fiber optic bundle since the random distribution of the individual fiber optics destroys the image characteristics of the light source.

DETAILED DESCRIPTION

As required, a detailed illustrative embodiment of the invention is disclosed herein. This embodiment exemplifies the invention and is currently considered to be the best embodiment for that purpose. However, it is to be recognized that modifications to the fiber optic bundle utilized to implement the principles of the invention can be made. Accordingly, the specific fiber optic bundle disclosed is representative in providing a basis for the claims which define the scope of the present invention.

As above discussed, the invention provides an optical pressure transducer utilizing a fiber optic bundle having one end fixed to a diaphragm type pressure measuring device utilizing a diaphragm having a reflective surface, preferably uniformly reflective. The other end of the fiber optic bundle is divided into two bundles which can be substantially equal, designated as a light source bundle and a reflected light bundle. The light source bundle end is illuminated by a light source conveying light to the transducer diaphragm. The reflected light bundle end conveys light reflected from the diaphragm to a light detection device. The optical fibers defining the light source bundle and the reflected light bundle are intermingled so as to be randomly combined adjacent the transducer diaphragm.

Figure 1:
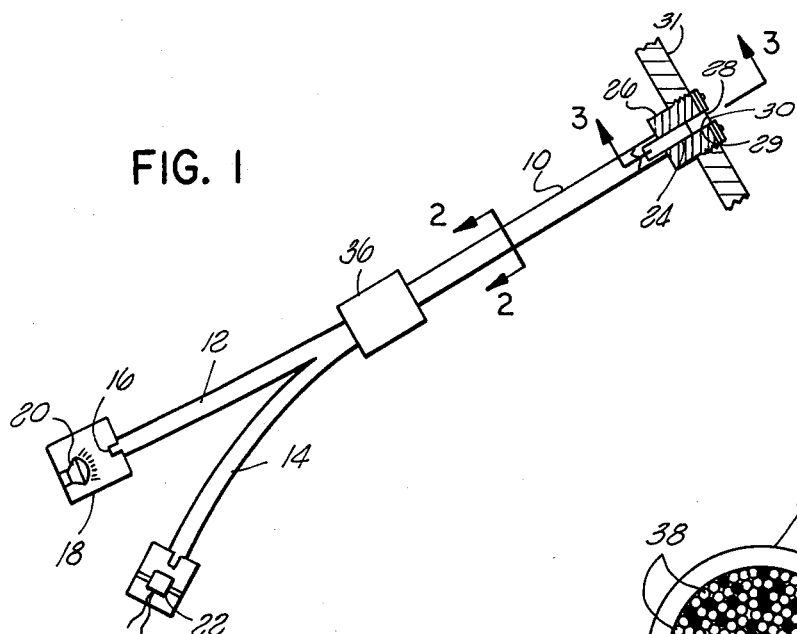
FIG. 1 is an optical pressure transducer according to the present invention.

Referring to FIG. 1, a combined fiber bundle 10 is divided into two substantially equal bundles 12 and 14 in which the first bundle 12 defines a light source bundle and the second bundle 14 defines a reflected light bundle. The free end 16 of the light source bundle 12 is disposed within a holding structure 18 containing a light source 20. In the particular embodiment herein described, the light source 20 is an incandescent lamp of any conventional type, although any light source such as a fluorescent lamp, laser, etc., could be utilized. The reflected light bundle 14 is positioned in a holding fixture 21 so that its end is a predetermined distance from a light measuring device 22. In this embodiment the light measurement device is a cadmium sulphide photocell although any device capable of providing an indication proportional to light intensity could be utilized, such as a photodiode.

The combined fiber bundle end 24 is mounted within a pressure transducer 26 having a diaphragm 28 which deflects proportional to a pressure differential across inner and outer surfaces 29 and 30 of the diaphragm. The diaphragm inner surface 29 must be of a light reflective material. The pressure transducer 26, which will be described in more detail below, is threaded so that it can be inserted into a pressure isolating partition 31 having an appropriately tapped hole. A holding sleeve 36 is provided merely to prevent a Y formed by the intersection of the first and second fiber bundles 12 and 14 from deepening. Fibers used within the bundle are well known in the optical transmission art and could be of many different types; for example, coated glass or organic polymer fiber. The combined bundle should contain at least 100 optical fibers and it has been found that between 500 and 1000 fibers have performed particuarly well for this application. Fiber sizes used have been 1/1000 of an inch in diameter.

Figure 2:
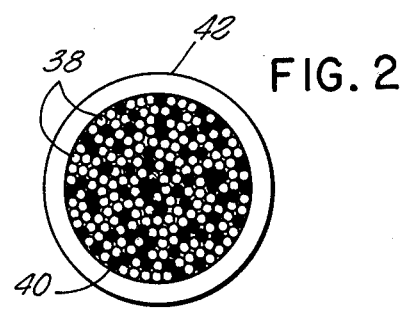
FIG. 2 is a cross-section taken along line 2—2 of FIG. 1 showing the fibers comprising the combined bundle.

The separate fiber optic bundles are formed by dividing the combined fiber bundle 10 into two substantially equal bundles 12 and 14. This division is accomplished in a rapid and uncontrolled manner, thereby insuring that the distribution of light source fibers and reflected light fibers is substantially random within the combined bundle 10. Referring to FIG. 2, the light source fibers 38, as represented by the circles, and the reflected light fibers 40, as represented by the darkened circles, are randomly distributed across the combined fiber bundle 10 cross section. It is this random distribution of the two fiber groups 38 and 40 within the combined bundle 10 which washes out the characteristics of the light source and provides the improved characteristics described above. It is theorized that for the advantages of the invention to be realized, the distribution of the two fiber groups 38 and 40 within the combined fiber bundle 10 should be such that contiguous fibers should not enclose an area containing only like fibers 38 or 40 which is more than ten percent of the cross-sectional area of the combined fiber bundle 10. The entire fiber optic bundle is encased in an elastomeric material 42, such as rubber, in order to provide protection for the individual fibers and to facilitate handling and use.

Figure 3:
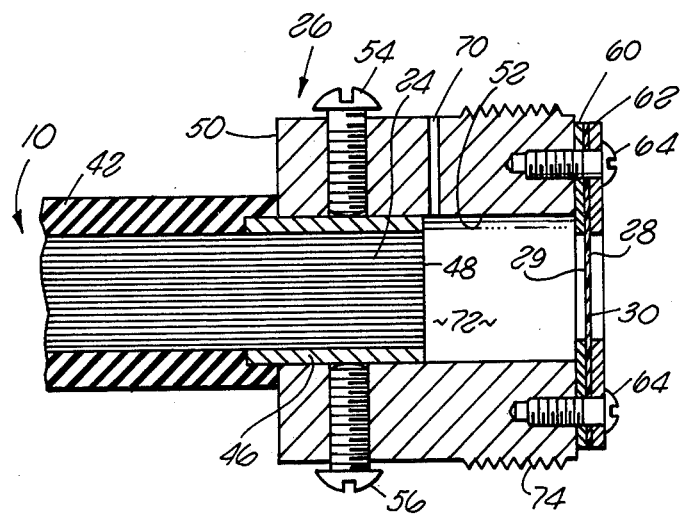
FIG. 3 is a cross-section taken along line 3—3 of FIG. 1 showing attachment of the pressure transducer to the combined fiber bundle end.

Attachment of the pressure transducer 26 to the combined fiber bundle end 24 is shown in FIG. 3. The fiber optic bundle end 24 is enclosed in a metal sleeve 46 which extends partially into the elastomeric covering 42 of the fiber optic bundle. The combined fibers form an end surface 48 which is flush with an end of the metal sleeve 46. The pressure transducer consists of a metal cylinder 50 having a central bore 52 equal in diameter to that of the metal sleeve 46. The inner surface of the central bore 52 is coated with a light-absorbing substance such as dull black paint in order to prevent reflections from any source other than the inner surface 29 of the diaphragm. Two attachment screws 54 and 56 are used to secure the cylinder 50 to the sleeve 46. The diaphragm 28 can be of any suitable reflective material such as reflecting aluminum or mylar as commonly used in diaphragm-type pressure transducers.

The diaphragm 28 is positioned between two clamping rings 60 and 62 which are secured by screws 64 to the cylinder 50. The clamping rings 60 and 62 have central aperture diameters slightly smaller than the diameter of the combined bundle end 48 and are positioned so that their central apertures are centrally disposed over the bundle end 48. The slightly smaller operative diameters result in a more linear relation between the pressure differential present and the output of the light measuring diode 22. A pressure equalizing vent 70 is also provided in order to insure that the pressure within a transducer chamber 72 defined by the diaphragm 28, the central bore 52 and the combined bundle end surface 48 is equal to the outside ambient pressure. It would also be possible to provide a pressure control device to mate with the pressure equalizing vent 70. This device could provide a known pressure within the chamber 72 to equalize an approximately known pressure on the outer side 30 of the diaphragm 28, thus enabling measurement of small pressure differentials within a medium having an absolute pressure much higher than the ambient pressure. Threads 74 are provided so that the transducer can be permanently affixed to the pressure isolating partition 31 (FIG. 1).

Figure 4:
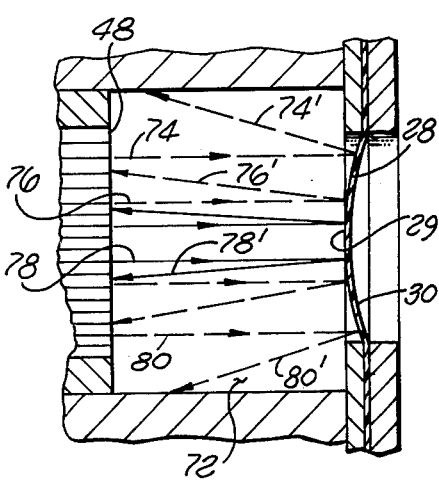
FIG. 4 is an enlarged view of the chamber between the combined bundle end and the pressure transducer diaphragm showing light radiated from and reflected back into the combined bundle end.

Referring to FIG. 4, the transducer chamber 72 is shown in a state when the pressure on the outer side 30 of the diaphragm 28 is greater than the pressure within the chamber 72, thereby causing the inner surface 29 of the diaphragm to become concave with respect to the inside of the chamber 72. Light entering the light source bundle 12 and radiating from the end 48 of the combined bundle 10 is represented by light source rays shown as 74, 76, 78 and 80. Reflection from the diaphragm is represented by rays shown as 74', 76', 78' and 80'. It can be appreciated that as a result of the concave deflection of the diaphragm 28 some of the light reflected from the diaphragm surface 29 will not be reflected back into the combined fiber bundle end 48 and consequently will not be measured by the light measuring device 22. As the pressure increases, the diaphragm 28 will become more concave and less light will be reflected into the bundle end 48. The lost light absorbed by the coating on the bore 52 is schematically represented as rays 74' and 80'. If the pressure on the outer side 30 of the diaphragm 28 is less than the pressure within the chamber 72, the explanation would be similar except that the diaphragm 28 will assume a convex shape with respect to the inside of the chamber 72.

An output calibration of the light measuring device 22 as a function of the pressure differential experienced by the diaphragm 28 provides a precise measurement of the pressure differential present. Due to the randomness of the fiber optics within the combined bundle 10, intensity variations across the light source 20 are diffused thereby eliminating the length required of conventional optical pressure transducers. In addition, this diffusion of the light intensity variations allows the light source 20 to be repositioned with respect to the end 16 of the fiber bundle 12 without affecting the calibration of the light measuring device. In a similar manner, the diffusive characteristics of a large number of randomly disposed optical fibers within the combined bundle 10 allows the fiber optic bundle to be replaced without a recalibration of the light source 20, transducer 26 and light measuring device 22 combination.

A further embodiment, not shown, could utilize a coherent light source to irradiate the light source bundle end 16. The phase relationship of light radiating from the reflected light bundle end with respect to the phase of the coherent light source would be proportional to the diaphragm 28 deflection, and therefore proportional to the pressure differential across the diaphragm surfaces 29 and 30. Phase comparison devices for the above application are commercially available.

I claim:

1. An optical pressure transducer comprising:
   a source of coherent light;
   means for light detection;
   a pressure-responsive diaphragm having a light-reflective surface deflectable in proportion to a pressure differential across the diaphragm; and
   a fiber optic bundle for transmitting light from said light source to said diaphragm surface and transmitting reflected light from said diaphragm surface to said light detection means comprising a first light source bundle having a plurality of optical fibers, one end of which is irradiated with coherent light from said light source, a second reflected light bundle having a plurality of optical fibers, one end of which conveys reflected light to said light detection means, and a combined bundle having an end consisting of the other ends of said light source bundle and reflected light bundle, said other ends being substantially randomly distributed across said combined bundle end, said diaphragm being positioned to reflect a portion of coherent light radiated from said first combined bundle end into said second combined bundle end, whereby the phase differential between light radiated from said coherent light source and light reflected from said diaphragm is proportional to deflection of said diaphragm.

2. The transducer of claim 1 in which fibers in said combined bundle are disposed so that contiguous fibers from one of said first and second bundles enclosed an area containing only fibers from that bundle which is not more than 10 percent of the cross-sectional area of the area of the combined fiber bundle.

3. The transducer of claim 1 in which said combined bundle contains at least 100 optical fibers, approximately 50 percent of which consist of said light source bundle optical fibers.

4. The transducer of claim 1 in which the optical fibers constituting said fiber optic bundle are less than 60 cm. in length.